(12) United States Patent
Ehlers et al.

(10) Patent No.: US 8,925,862 B2
(45) Date of Patent: Jan. 6, 2015

(54) MONUMENT COMPLEX FOR AN AIRCRAFT REAR AREA

(75) Inventors: Bernd Ehlers, Hamburg (DE); Mark Herzog, Barsbüttel (DE)

(73) Assignee: Airbus Operations GmbH, Hamburg (DE)

(*) Notice: Subject to any disclaimer, the term of this patent is extended or adjusted under 35 U.S.C. 154(b) by 61 days.

(21) Appl. No.: 13/279,097

(22) Filed: Oct. 21, 2011

(65) Prior Publication Data

US 2012/0273614 A1 Nov. 1, 2012

Related U.S. Application Data

(63) Continuation of application No. PCT/EP2010/052942, filed on Mar. 9, 2010.

(60) Provisional application No. 61/172,023, filed on Apr. 23, 2009.

(30) Foreign Application Priority Data

Apr. 23, 2009 (DE) .......................... 10 2009 018 690

(51) Int. Cl.
*B64D 11/00* (2006.01)
*B64D 11/02* (2006.01)
*B64D 11/04* (2006.01)

(52) U.S. Cl.
CPC ............... *B64D 11/02* (2013.01); *B64D 11/04* (2013.01)
USPC .................... 244/118.5; 244/118.6; 244/119; 244/129.5; D12/195

(58) Field of Classification Search
USPC ........ 244/118.5, 118.6, 119, 129.5; D12/195; 186/40
See application file for complete search history.

(56) References Cited

U.S. PATENT DOCUMENTS

| 4,055,317 | A | | 10/1977 | Greiss | |
|---|---|---|---|---|---|
| 5,150,863 | A | * | 9/1992 | Hozumi | 244/118.5 |
| 5,611,093 | A | * | 3/1997 | Barnum et al. | 4/624 |
| 6,003,813 | A | | 12/1999 | Wentland et al. | |
| 6,464,169 | B1 | | 10/2002 | Johnson et al. | |
| 6,615,421 | B2 | * | 9/2003 | Itakura | 4/664 |
| 6,877,694 | B2 | * | 4/2005 | Gonzalez | 244/118.5 |
| 6,938,284 | B2 | * | 9/2005 | Kitade et al. | 4/664 |

(Continued)

FOREIGN PATENT DOCUMENTS

| CA | 2640123 A1 | 8/2007 |
|---|---|---|
| DE | 102006034862 A1 | 1/2008 |

(Continued)

OTHER PUBLICATIONS

German Patent Office, German Office Action dated Mar. 1, 2010 for German Application No. 102009018690.5.

(Continued)

*Primary Examiner* — Mark Hellner
*Assistant Examiner* — Assres H Woldemaryam
(74) *Attorney, Agent, or Firm* — Ingrassia Fisher & Lorenz, P.C.

(57) ABSTRACT

A monument complex is provided for a rear area of a passenger cabin. The rear contour of the monument complex is adapted to the contour of the bulkhead so that an additional wash basin can be installed without there being any loss of space in the passenger cabin.

11 Claims, 2 Drawing Sheets

(56) References Cited

U.S. PATENT DOCUMENTS

| | | | |
|---|---|---|---|
| 7,025,306 B2 * | 4/2006 | Saint Jalmes | 244/118.6 |
| 7,222,820 B2 | 5/2007 | Wentland et al. | |
| 7,364,119 B2 * | 4/2008 | Sprenger et al. | 244/118.6 |
| 7,395,989 B2 * | 7/2008 | Saint-Jalmes et al. | 244/118.1 |
| 7,406,722 B2 * | 8/2008 | Fukuizumi et al. | 4/623 |
| 8,005,580 B2 * | 8/2011 | McAvoy | 701/3 |
| 8,296,875 B2 * | 10/2012 | Loberger et al. | 4/623 |
| 2003/0155466 A1 * | 8/2003 | Wentland et al. | 244/118.5 |
| 2004/0163170 A1 * | 8/2004 | Cooper et al. | 4/664 |
| 2004/0227034 A1 * | 11/2004 | Wentland et al. | 244/119 |
| 2005/0001097 A1 * | 1/2005 | Saint-Jalmes | 244/118.6 |
| 2005/0116099 A1 * | 6/2005 | Pho et al. | 244/118.5 |
| 2005/0230539 A1 * | 10/2005 | Quan | 244/118.1 |
| 2006/0145002 A1 | 7/2006 | Van Loon | |
| 2007/0278346 A1 * | 12/2007 | Masset-Bosc et al. | 244/118.5 |
| 2008/0127411 A1 | 6/2008 | Hoffjann et al. | |
| 2008/0128551 A1 | 6/2008 | Young et al. | |
| 2009/0065641 A1 | 3/2009 | Koehn et al. | |
| 2009/0261200 A1 * | 10/2009 | Saint-Jalmes et al. | 244/118.5 |
| 2009/0314889 A1 | 12/2009 | Baatz et al. | |

FOREIGN PATENT DOCUMENTS

| | | | | |
|---|---|---|---|---|
| DE | 102006042300 A1 | 3/2008 | | |
| EP | 1986914 A1 | 11/2008 | | |
| FR | 0801668 | * | 2/2009 | B64D 11/00 |
| WO | 2004076279 A2 | 9/2004 | | |

OTHER PUBLICATIONS

WIPO, International Preliminary Report on Patentability dated Oct. 25, 2011 for International Application No. PCT/EP2010/052942.

International Search Report for International Application PCT/EP2010/052942 dated Jul. 10, 2010.

State Intellectual Property Office of the Peoples' Republic of China, Office Action for Chinese Patent Application No. 201080022636.6, mailed Oct. 25, 2013.

European Patent Office, Extended European Search Report mailed May 26, 2014 for European Patent Application No. EP 13 19 9330.5.

* cited by examiner

MONUMENT COMPLEX FOR AN AIRCRAFT REAR AREA

CROSS-REFERENCE TO RELATED APPLICATIONS

This application is a continuation of International Application No. PCT/EP2010/052942, filed Mar. 9, 2010, which was published under PCT Article 21(2) and which claims priority to German Patent Application No. 10 2009 018 690.5-22 filed Apr. 23, 2009 and of U.S. Provisional Application No. 61/172 023 filed Apr. 23, 2009, the disclosures of which applications are hereby incorporated herein by reference.

TECHNICAL FIELD

The technical field relates to the fitting out of aircraft cabins. In particular, the technical field relates to a monument complex to be mounted in a rear area of a cabin of an aircraft, to an aircraft with a monument complex, and to the use of a monument complex in an aircraft.

BACKGROUND

In present-day aircraft, monuments, for example on-board lavatory monuments or galley monuments, comprise three or four planar walls. WO 2004/076279 A2 describes an aircraft lavatory arrangement with several lavatories for the rear area of an aircraft cabin. An entry region is provided that is arranged in front of the urinals in the rear area, and behind the wash basins in the front area of the arrangement. CA 2 640 123 A1 and EP 1 986 914 A1 describe a galley arrangement for an aircraft, which galley arrangement comprises four planar walls.

It is at least one object to provide an improved arrangement of system components in a passenger cabin of an aircraft, which arrangement takes up as little cabin space as possible. In addition, other objects, desirable features and characteristics will become apparent from the subsequent detailed description, and the appended claims, taken in conjunction with the accompanying drawings and this background.

SUMMARY

Stated are a monument complex to be mounted in a rear area of a cabin of an aircraft, an aircraft comprising such a monument complex, and the use of a monument complex in an aircraft.

According to an exemplary embodiment, a monument complex to be mounted in a rear area of a cabin of an aircraft is stated, which monument complex comprises a system component, a rear contour and an entrance region. The system component is a component selected from the group comprising wash basin surrounds and a floor cupboard with systems engineering equipment contained therein. The entrance region is arranged in front of the system component, and the rear contour of the monument complex is at least in part adapted to a contour of the rear area of the cabin.

The notion of the entrance region being arranged "in front" of the system component denotes that when viewed in the direction of flight the entrance region is situated in front of the system component when the monument complex is installed in the cabin of the aircraft. In other words, from the cabin the passenger steps into the entrance region of the monument complex and can then move on in the direction of the system component.

The notion that the rear contour of the monument complex is at least in part adapted to the contour of the rear area of the cabin means that the rear of the monument complex is not a planar wall, because, as a rule, the contour of the rear area of the cabin is a surface curved in three dimensions.

According to a further exemplary embodiment, the rear contour of the cabin is predetermined by a bulkhead.

According to a further exemplary embodiment, the rear contour of the cabin defines a space. The system component is at least in part arranged in the defined space.

According to a further exemplary embodiment, the monument complex and at least some of the components installed therein, for example wash basin surrounds including a floor cupboard and systems engineering equipment contained therein, project at least in part or entirely into the space defined by the rear contour.

According to a further exemplary embodiment, the monument complex comprises a second system component, which is a lavatory. Of course, still further system components, for example a second or third lavatory and/or several further wash basin surrounds, can be provided.

According to a further exemplary embodiment, the rear contour is designed as a surface curved in three dimensions.

According to a further exemplary embodiment, the monument complex comprises two on-board lavatory modules.

The two on-board lavatory modules can be designed so as to be separate of each other or integral. In other words, the monument complex can be designed so as to be in several parts or in one part.

According to a further exemplary embodiment, the monument complex comprises one galley module or several such galley modules.

The monument complex can also comprise a galley and/or an on-board lavatory complex.

According to a further exemplary embodiment, the monument complex comprises a first door to a first sub-area of the monument complex, and a second door to a second sub-area of the monument complex. The first door and the second door encompass an angle other than approximately 180 degrees relative to each other. In this way valuable space in the passenger cabin can be saved because the two doors are not arranged perpendicularly to the longitudinal axis of the aircraft, but instead obliquely to the longitudinal axis.

According to a further exemplary embodiment, the monument complex comprises a dividing wall for separating the two on-board lavatory modules from each other. The dividing wall is arranged in the middle of the monument complex. In the case of the monument complex being designed in the form of two separate on-board lavatory modules, the dividing wall is designed so as to be double-walled, for example there are two separate dividing walls. One dividing wall is associated with one on-board lavatory module, and the other dividing wall is associated with the other on-board lavatory module.

According to a further exemplary embodiment, the rear contour is designed as a continuous wall. This continuous wall can be designed in a stepped manner, for example as shown in FIG. 2A, or it can be curved in two dimensions or even in three dimensions as shown in FIG. 3.

According to a further exemplary embodiment, the monument complex is designed in the form of two sub-modules which during installation in the cabin of the aircraft are inserted separately from each other into the cabin. The sub-modules are then interconnected only in the cabin, provided such interconnection is required at all.

According to a further exemplary embodiment, the cabin is a passenger cabin of a commercial aircraft.

According to a further exemplary embodiment, an aircraft comprising a monument complex described above and below is stated.

According to a further exemplary embodiment, the use of a monument complex in an aircraft that is described above and below. The aircraft is, for example, a passenger aircraft (with or without a pressurized cabin) or a helicopter or an airship (zeppelin).

Below, exemplary embodiments are described with reference to the figures.

BRIEF DESCRIPTION OF THE DRAWINGS

The present invention will hereinafter be described in conjunction with the following drawing figures, wherein illustrations in the figures are diagrammatic and not to scale and like numerals denote like elements, and.

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
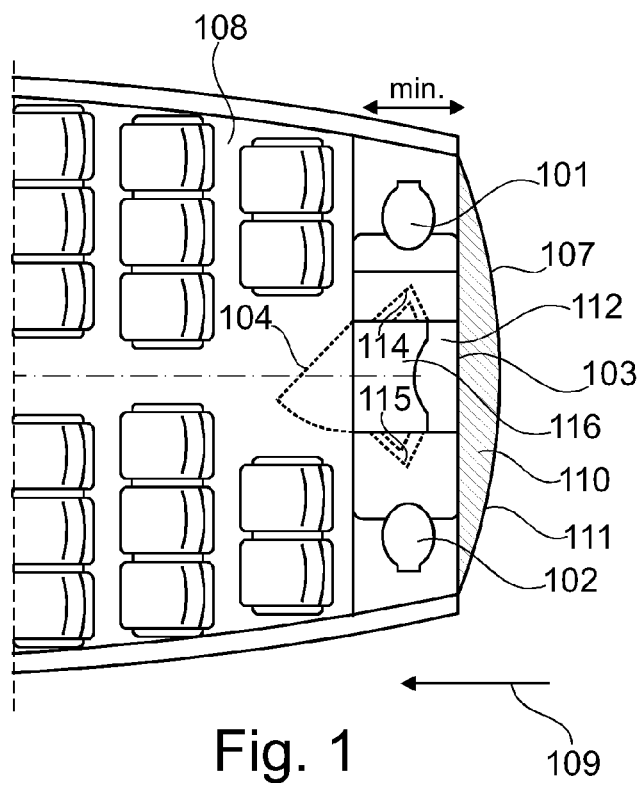
FIG. 1 shows a view of a rear area of an aircraft cabin with a monument complex arranged therein.

FIG. 1 shows a rear area of a passenger cabin 108 of an aircraft. The arrow 109 indicates the direction of flight. In the rear area a lavatory complex is arranged that comprises two lavatories 101, 102. A main entrance door 104 is provided that opens to the outside (in other words, forwards towards the passenger cabin). Through this door 104 the user enters the entry region or entrance region 116. Behind the entrance region 116 wash basin surrounds 112 are arranged.

To the left-hand side and the right-hand side of the entrance region 116 the two lavatory modules with the lavatories 101, 102 are provided. The modules can be opened by way of the folding doors 114 and 115.

The complex is arranged directly in front of the rear bulkhead 111, which is usually designed so as to be concave towards the cabin side. In this manner a dead or unused space arises in that location. This space cannot be used for cabin functions.

The dead space 110 defined by the curved contour 107 of the bulkhead 111 is not used by the lavatory modules. The rear contour 103 of the modules is designed in the form of a planar wall.

Figure 2A:
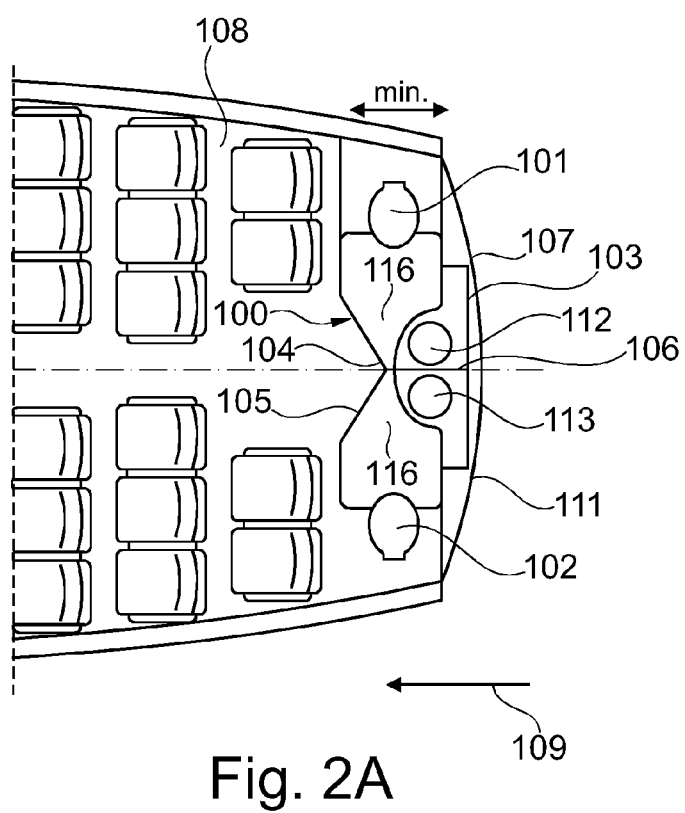
FIG. 2A shows a view of a rear area of an aircraft cabin according to an exemplary embodiment.

FIG. 2A shows a monument complex 100 according to an exemplary embodiment of the invention, which monument complex 100 is arranged in the rear area of the passenger cabin 108.

The monument complex 100 comprises two individual lavatory modules, each comprising a lavatory 101, 102. The two lavatory modules abut and are separated from each other by way of the dividing wall 106. It is also possible for two such dividing walls 106 to be provided, in each case one dividing wall 106 for one of the two modules.

Furthermore, continuous wash basin surrounds or wash basin surrounds divided into two are provided (see reference characters 112, 113), each comprising a wash basin for the left-hand and the right-hand lavatory modules.

In the case of a single-part wash basin surrounds the dividing wall 106 comprises a corresponding recess through which the wash basin surrounds extends.

Two doors 104, 105 are provided, one for the left-hand module with the lavatory 101, and one for the right-hand module with the lavatory 102. The two doors encompass an angle other than 180 degrees relative to each other. In the case of the exemplary embodiment of FIG. 2A the angle is approximately 120 degrees. However, the angle could also be approximately 90 degrees.

As a result of this angle, additional space in the passenger cabin is gained. Through the left-hand door 104 the user reaches the upper entrance region 116, and through the right-hand door 105 the user reaches the right-hand (lower) entrance region 116 of the second lavatory module.

The rear contour 103 of the monument complex is adapted to the shape of the rear area of the cabin, thus in particular to the shape of the bulkhead 111. This is achieved in that the one or several wash basin surrounds 112, 113 are partly arranged in the space defined by the curvature of the bulkhead. In this manner, additional space in the direction of flight 109 is gained.

As shown in FIG. 1, the lavatory complex is minimized in the X-length (in other words in the direction of flight 109). Based on this embodiment, where only one wash basin surrounds with narrow access, comfortable use is not possible. Classical enlargement of the lavatory in the direction of flight 109 would result in the loss of valuable seating space.

As shown in FIG. 2A, the overall volume of the lavatories is enlarged, without the monument complex being extended in the direction of flight 109. Consequently the movement space within the lavatory is enlarged. The example in FIG. 2A shows how from the lavatory shown in FIG. 1, as a result of the enlargement, a comfortably-usable lavatory is provided, without this resulting in the loss of seating space. For example, the wash basin surrounds 112, 113 and the floor cupboard with systems engineering equipment contained therein are, at least in part, displaced to the newly-gained space. The addition of box-shaped extensions involves only little additional cost during manufacture, while, in contrast to this, gaining several inches of cabin length returns very substantial benefits.

This is thus a lavatory where the space in the bulkhead curvature is utilized.

Figure 2B:
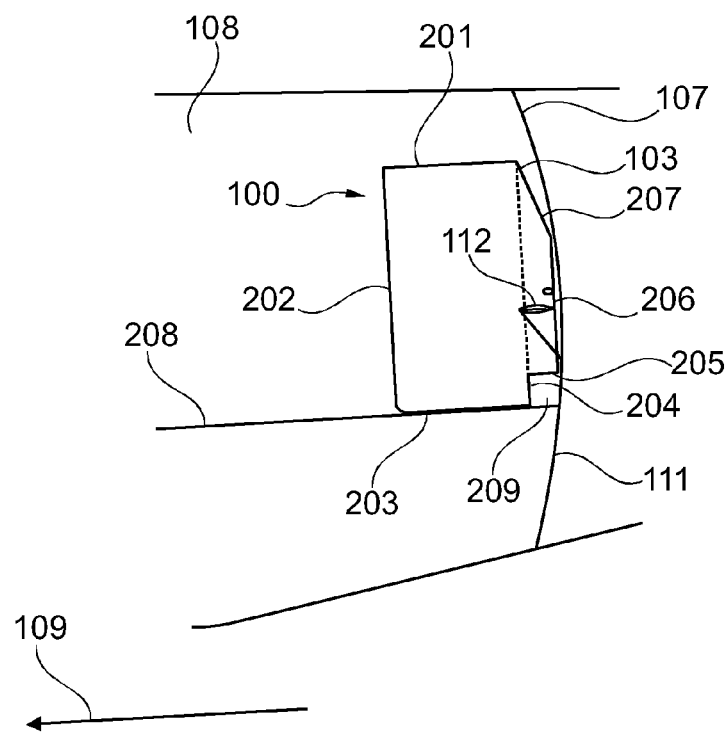
FIG. 2B shows a lateral view of the rear area of FIG. 2A.

The embodiments provide for the wall of the monument complex, which in the present example is the lavatory, which faces the bulkhead, being designed in such a manner that optimized utilization of space results. Instead of a planar wall a wall with a contour that approximates the contour of the bulkhead is installed. Thus, as a result of the newly gained space, an additional wash basin can be provided, as shown in FIG. 2A and FIG. 2B. Furthermore, the usable entrance region is enlarged.

In this arrangement identical materials and designs can be used that would normally be used for rear walls of monuments.

Figure 3:
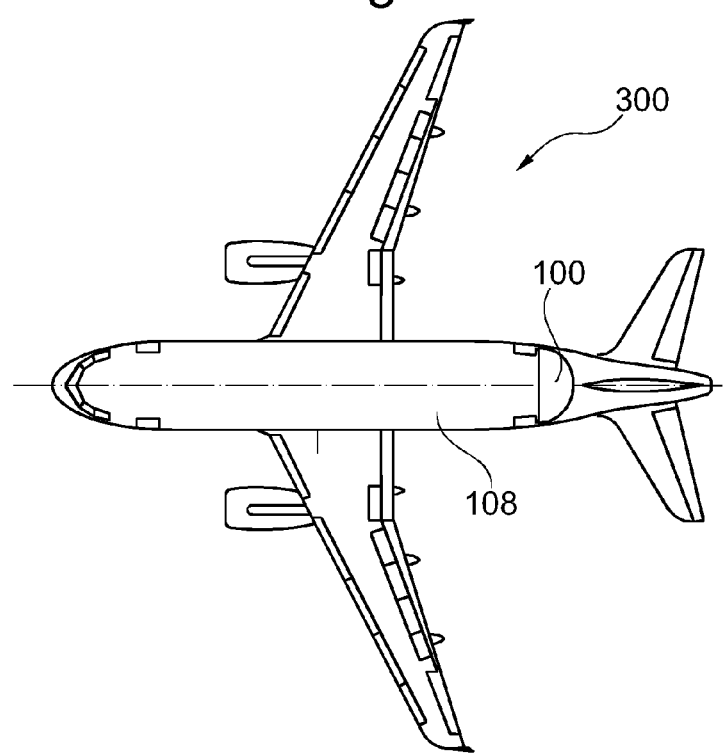
FIG. 3 shows an aircraft with a monument complex according to an exemplary embodiment.

A further improvement can be achieved by means of a wall that is designed as an offset (e.g., a three-dimensionally curved surface) of the bulkhead, as shown in FIG. 3.

FIG. 2B shows a lateral view of the region of FIG. 2A. The monument complex 100 comprises a ceiling 201, a front wall 202, a floor 203 and several rear wall segments 204, 205, 206, 207.

The various segments of the rear wall can be integrally connected. The monument complex is arranged on the cabin floor 208.

As shown in FIG. 2B, the rear wall segments 204, 205 encompass a space 209 in which the system lines can be located, which system lines connect the system components of the monument complex to the aircraft supply. To this effect the first segment 204 is arranged vertically, and the second segment 205 is arranged horizontally.

FIG. 3 shows an aircraft 300 with a monument complex 100, arranged in the rear area, with a two-dimensionally or three-dimensionally curved rear wall.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft comprising a monument complex mounted in a rear area of a cabin of the aircraft, the monument complex comprising:
    two abutting lavatory modules mounted directly in front of a rear bulkhead of the aircraft, divided from each other by a dividing wall, each of the lavatory modules including a wash basin and an entrance region arranged in front of the wash basin with respect to a flight direction, the entrance region opposite a rear contour defined by both of the lavatory modules, the entrance region including a first sub-area and a second sub-area;
    a first door to the first sub-area of the monument complex;
    a second door to the second sub-area of the monument complex, the first door and the second door each directly coupled at an end to the dividing wall such that an angle between the first door and the second door is less than 180 degrees and at least one of the first door and the second door is positioned in front of the wash basin with respect to a flight direction;
    the rear contour of the lavatory modules having an outside edge directly facing the rear bulkhead arranged in the rear of the cabin, and the rear contour of the lavatory modules is a non-planar wall that is at least in part adapted to conform to a curved contour of the rear bulkhead, and the non-planar wall of the rear contour defines a space inside each of the lavatory modules; and
    wherein the wash basins are arranged at least in part in a space defined by the curved contour of the rear bulkhead and the space defined by the non-planar wall of the lavatory modules.

2. The aircraft of claim 1, wherein teach of the lavatory modules comprises a floor cupboard with systems engineering equipment contained therein.

3. The aircraft of claim 1,
    wherein the rear contour of the cabin is predetermined by the rear bulkhead.

4. The aircraft of claim 1,
    wherein the rear contour is a three-dimensionally curved surface.

5. The aircraft of claim 1,
    wherein the monument complex further comprises a galley module.

6. The aircraft of claim 1,
    wherein the monument complex and components installed therein project at least in part into the space defined by the curved contour of the rear bulkhead.

7. The aircraft of claim 1,
    wherein the dividing wall is arranged in an approximate middle of the monument complex.

8. The aircraft of claim 1,
    wherein the rear contour is a continuous wall.

9. The aircraft of claim 1,
    wherein the monument complex comprises two sub-modules that during installation in the cabin are inserted separately from each other into the cabin.

10. The aircraft claim 1,
    wherein the cabin is a passenger cabin.

11. An aircraft comprising a monument complex mounted in a rear area of a cabin of the aircraft, the monument complex comprising:
    two directly abutting lavatory modules that form a rear contour and each lavatory monument including a wash basin, an entrance region arranged in front of the wash basin with respect to a flight direction, the entrance region spaced apart from the rear contour, the entrance region including a first sub-area and a second sub-area;
    a first door to the first sub-area of the monument complex;
    a second door to the second sub-area of the monument complex, the first door and the second door each directly coupled at an end to the dividing wall such that an angle between the first door and the second door is less than 180 degrees and at least one of the first door and the second door is positioned in front of the wash basin with respect to a flight direction; and
    the rear contour of the lavatory modules having an outside edge directly facing a rear bulkhead arranged in the rear of the cabin, the rear contour comprising a non-planar wall that at least in part conforms to a curved contour of the rear bulkhead in the rear area of the cabin, the non-planar wall defining a space inside each of the lavatory modules;
    wherein the wash basins are arranged adjacent to the rear contour at least in part in a space defined by the curved contour of the rear bulkhead and the space defined by the non-planar wall of the lavatory modules.

* * * * *